Figures 1, 2:
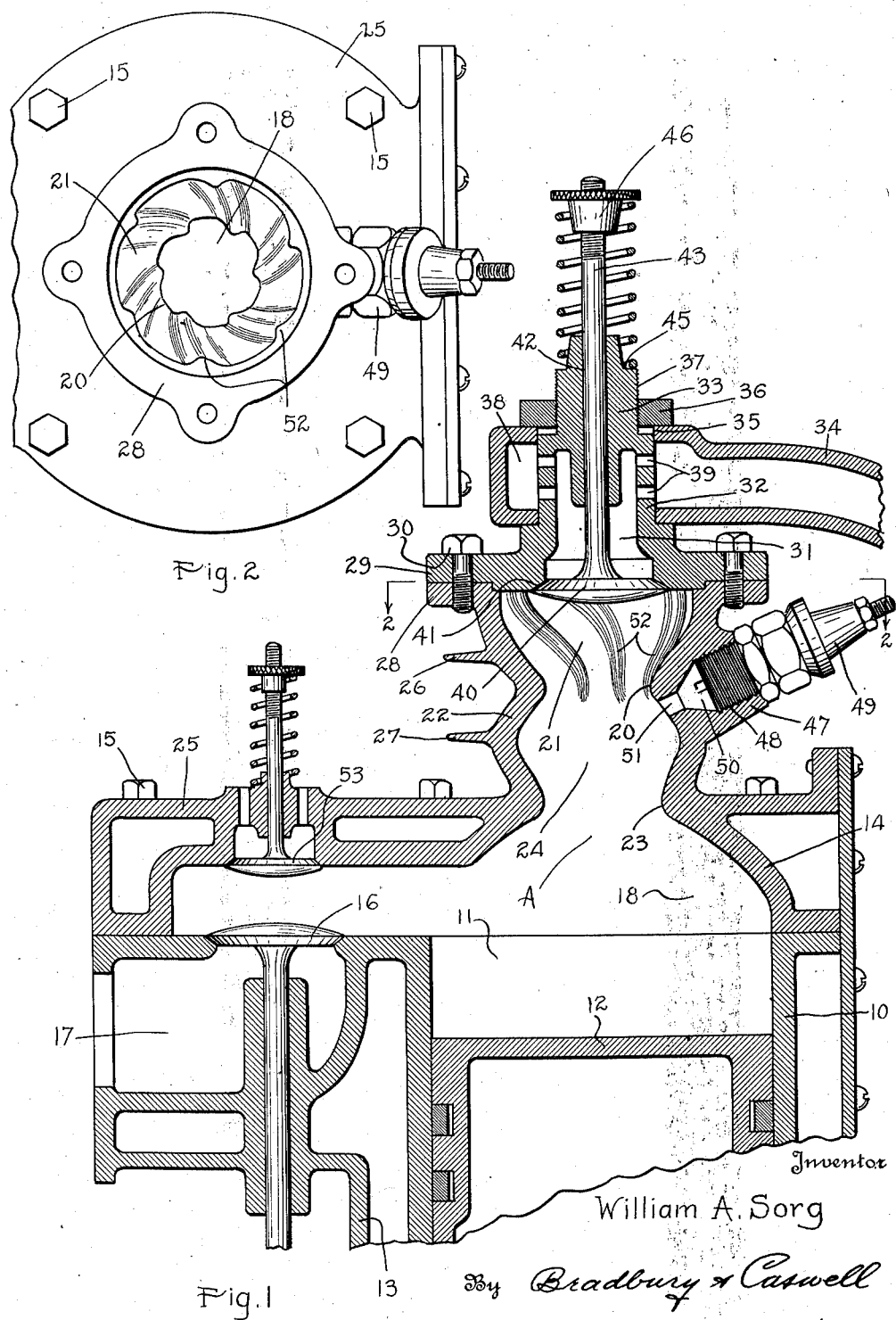

March 11, 1930.    W. A. SORG    1,750,063
INTERNAL COMBUSTION ENGINE
Filed Jan. 23, 1926

Inventor
William A. Sorg
By Bradbury & Caswell
Attorneys

Patented Mar. 11, 1930

1,750,063

UNITED STATES PATENT OFFICE

WILLIAM A. SORG, OF OWOSSO, MICHIGAN

INTERNAL-COMBUSTION ENGINE

Application filed January 23, 1926. Serial No. 83,228.

My invention relates to internal combustion engines and particularly to the low compression type fired with an electric spark.

It is an object of the invention to provide an engine having a casing forming a vaporizer and providing a combustion chamber adapted to completely and effectively vaporize, gasify and burn the liquid fuel so that power may be developed from the heavier hydro-carbons, such as kerosene, and fuel oil as well as alcohol, without increasing the weight of the engine and in such a manner as to prevent detonation, accumulation of carbon deposits, and valve warpage resulting from after burning.

It is another object of my invention to heat the vaporizer and to construct the same in such a manner that the fuel mixture is brought into direct contact with the hot walls of the vaporizer so that a portion of the fuel is converted into a gas of the lighter series, the remainder being cracked and partly disassociated, said fuel being further vaporized, gasified and mixed to form a hot dry fuel mixture readily susceptible to ignition from the ordinary electric spark and of such properties as to rapidly propagate the flame after ignition.

Another object of the invention resides in providing a catalyzer within the vaporizer which has a catalytic effect upon the hydrocarbons, thereby enhancing the generation of the fuel vapors and producing a stable gas adapted to rapidly propagate flame.

In carrying out the objects of my invention I construct said vaporizer in the form of a casing having an elongated chamber forming a portion of the clearance space of the cylinder of the engine, which casing is arranged with a number of restrictions providing intercommunicating compartments therein. Upon the power stroke of the engine this elongated chamber serves as a combustion chamber, while upon the suction and compression strokes the upper compartment serves as a vaporizing compartment, and the adjoining compartment as an ignition compartment. I further place the intake valve of the engine at the enlarged end of said vaporizing compartment so that the incoming charge of fresh fuel mixture drives the nitrogen and the spent gases of combustion remaining in the combustion chamber after an explosion, out of said combustion chamber and to the bottom of the cylinder preventing the retardation of the propagation of the flame and preventing pre-ignition from intermixing of the burned gases with the fresh fuel mixture. The volume of this combustion chamber being considerably less than the piston displacement, permits of completely scavenging the combustion chamber of all spent gases upon first opening the intake valve, leaving the combustion chamber and the upper portion of the cylinder completely filled with a charge of fresh clean fuel mixture which upon ignition produces a clean blue flame which is projected into the leaner cylinder contents thereby raising the temperature greatly and assuring the complete combustion of the entire cylinder contents. In addition I form the walls of said vaporizing compartment with spiralled ridges which continue beyond the restriction between the vaporizing compartment and the ignition compartment which ridges impart a whirling movement to the fuel mixture as it enters the ignition compartment, the effect being to throw the heavier particles of the fuel into contact with the walls of the vaporizer and to cause the vaporization thereof. I also line the interior of the vaporizer with a suitable catalyzer or cast the casing forming the same of a metal or alloy having suitable catalytic properties. By heating the vaporizer and causing the fuel globules to directly impinge upon the heated catalyzer, the catalytic action is greatly increased.

With the foregoing and other objects in view, which will appear in the following description, the invention resides in the novel combination and arrangement of parts and in the details of construction hereinafter described and claimed.

In the drawings, Fig. 1 is a longitudinal sectional view of a portion of an engine embodying my invention and Fig. 2 is a plan view of a portion of the engine shown in Fig. 1 with the valve structure removed to illustrate the construction of the vaporizing pocket.

In the drawings, I have illustrated only a portion of my improved engine, the remainder of which may be of common construction well known in the art. The engine, as shown, consists of a cylinder block 10 being bored at 11 to receive the usual piston 12. This cylinder block is surrounded by a water jacket 13 and has mounted on the top thereof a cylinder head 14 which is attached thereto by means of cap screws 15 in the ordinary manner. To the side of the cylinder block is mounted an exhaust valve 16 which closes a passageway 17 leading to the exhaust manifold of the engine, not shown in the drawings.

The cylinder head 14 is formed with a chamber 18 above the piston 12 and valve 16, which provides a clearance space for said piston and serves to conduct the burned gases to the valve 16. Axially disposed relative to the cylinder 10 I provide a tubular casing 22 which forms a vaporizer having an elongated chamber A commuicating with the chamber 18. Upon the power stroke of the engine this chamber serves as a combustion chamber. Within the chamber A in casing 22 are provided two constrictions 20 and 23 which form a hopper-like compartment 21 at the top of the casing serving as a vaporizing compartment and a bellied compartment 24 immediately below said vaporizing compartment serving as an ignition compartment. From the foregoing, it will be understood that the vaporizing compartment 21 opens into the ignition compartment 24 and that said latter compartment opens into the chamber 18. Around the chamber 18 is provided a water jacket 25 which serves to keep the same cooled and to prevent the exhaust valve from becoming overheated. It will be noted that the water jacket 25 does not extend up around the casing 22 so that the same is practically not cooled excepting through two spaced fins 26 and 27 extending circumferentially around said casing. This leaves the interior walls of the vaporizer chambers 21 and 24 relatively hotter than the cooled part of the cylinder and cylinder head which serves to vaporize and gasify the fuel as will be presently described.

The end of casing 22 is open and is formed with a flange 28 extending around the same, cap 29 being bolted to said flange 28 by cap screws 30. Issuing from the cap 29 is a sleeve 32 which is closed at its upper end by a boss 33, said sleeve forming a passageway 31 leading to the chamber 21. The intake manifold 34 of the engine is bored at 35 to fit snugly around the sleeve 32 and is held in place thereon by means of a nut 36, which is adapted to be screwed upon threads 37 formed on the boss 33. The fuel mixture provided by the carburetor of the engine, not shown, passes through the intake manifold 34, around an annular space 38 formed in said manifold and through a number of ports 39 in the sleeve 32 and into passageway 31, from which it passes into the chamber A in a manner soon to be described. The passageway 31 is closed by means of a poppet valve 40 which is seated on a conical seat 41 formed on cap 29 at the mouth of said passageway so that as the valve 40 is opened the fuel mixture is discharged directly into compartment 21. The boss 33 is drilled along its axis at 42 to form a guideway for the stem 43 of valve 40 which extends beyond said boss and has positioned around it a compression coil spring 44 seated at one end against a shoulder 45 formed on boss 33 and at its other end against a nut 46 mounted on the end of valve stem 43, which spring serves to hold the valve normally closed. In the form of engine illustrated, the intake valve 40 is adapted to be opened by the suction of the engine although it readily can be comprehended that the same may be opened by mechanical means if desired. In the event the valve 40 should break or otherwise drop down the same falls upon the wall of compartment 21 forming restriction 20 so that said valve is prevented from dropping down into the cylinder and causing injury to the engine by engagement with the piston 12.

Issuing outwardly from the casing 22, I provide a boss 47 which is internally threaded at 48 to receive a spark plug 49 and is formed with a space 50 surrounding the spark gap of said plug which communicates through an opening 51 with the interior of the compartment 24. When the plug 49 is fired in the ordinary manner, the charge of fuel mixture within ignition compartment 24 is ignited causing the explosion of the gas within the chamber A.

In the operation of my improved engine, on the suction stroke, fuel mixture is drawn into the vaporizing compartment 21 of the chamber A through the orifice formed between the valve seat 21 and valve 40. As will be noted the direction of travel of the incoming fuel mixture as it passes the valve seat 41 is at an angle to the wall of vaporizing compartment 21, which causes the mixture to impinge upon said wall and follow along the same entering into the ignition compartment 24 through the opening formed at the constriction 20 in chamber A. This causes most, if not all of the heavier particles of fuel oil suspended in the gas mixture to be precipitated upon the wall of said vaporizing compartment, while the lighter particles remain suspended and pass into compartment 24. Due to the effect of the combustion within the chamber A, the walls of casing 22 are maintained at a suitable temperature to cause the volatilization of the fuel globules deposited thereon in the passage of the fuel mixture through the vaporizer.

Along the wall of compartment 21, I provide a number of spiral ridges 52 which cause the incoming fuel mixture to whirl as the same passes through the chamber A. This has the effect of subjecting the fuel mixture to a relatively great extent of wall area of the chamber A and at the same time causes the fuel charge to become thoroughly mixed by being speeded up and whirled in its course of travel. It also causes all of the heavier particles of fuel not deposited on the wall compartment 21 and such particles not vaporized through contact with said wall to be precipitated upon the wall of ignition compartment 24 so that vaporization of the fuel mixture will be complete and the same rendered suitable for efficient combustion in the compartment 24, where the same is ignited as previously mentioned.

As the fresh charge of fuel mixture is drawn into the engine it scours the surface of the combustion chamber A, due to the formation of the same and completely removes all traces of spent gases therefrom so that a fresh fuel mixture remains in the ignition compartment at the time of ignition.

In addition to the intake valve 40, I employ a similar valve 53 positioned above the exhaust valve 16, which serves to admit a small amount of fresh air, aiding in cooling the exhaust valve and in forming a strata of air for separating the residue of the burned gases from the incoming fresh charge.

The interior of compartment 21, I preferably coat or line with some catalytic such as platinum or any other suitable substance. This has a catalytic effect upon the hydrocarbon gas passing through said compartment. In this manner the generation of the fuel vapor is greatly enhanced and at the same time a more stable gas is produced which is adapted to rapidly propagate flame.

Changes in the specific form of my invention, as herein disclosed, may be made within the scope of what is claimed without departing from the spirit of my invention.

Having described my invention, what I claim as new and desire to protect by Letters Patent is:

1. In an internal combustion engine, a cylinder, a piston movable therein, a cylinder head situated at the end of said cylinder providing a chamber having an ignition compartment therein, and a vaporizing compartment of substantially the same size as said first compartment communicating therewith, and means for conducting a fuel mixture into said vaporizing compartment.

2. In an internal combustion engine, a cylinder, a piston movable therein, a cylinder head situated at the end of said cylinder, providing a chamber having a hopper-like vaporizing compartment therein, the wall of said compartment being formed with spiral ridges, an intake valve positioned at the mouth of said compartment and adapted to cause the fuel mixture passing therethrough to impinge upon said ridged wall, said chamber being formed with an ignition compartment communicating with said vaporizing compartment and means for igniting fuel mixture within said ignition compartment.

3. In an internal combustion engine, a cylinder, a piston movable therein, a cylinder head situated at the end of said cylinder providing an elongated chamber, said chamber having a restriction providing a hopper-like vaporizing compartment, said elongated chamber having a second restriction therein forming an ignition compartment communicating with and located between the vaporizing compartment and cylinder, an intake valve mounted in said cylinder head at the mouth of said vaporizing compartment, said valve being adapted to direct the fuel mixture against the wall of said vaporizing compartment, and means for igniting the fuel within said ignition compartment.

4. In an internal combustion engine, a cylinder, a piston movable therein, a cylinder head situated at the end of said cylinder providing an elongated chamber, said chamber having two restrictions therein providing two compartments within said chamber, one a hopper shaped vaporizing compartment and the other a bellied ignition compartment communicating with said first compartment, the wall of said vaporizing compartment being provided with spiral ridges, an intake valve mounted at the mouth of said vaporizing compartment and adapted to direct the fuel mixture passing therethrough against the wall of said vaporizing compartment and to cause the same to follow said spiral ridges, and means for igniting the fuel mixture within said ignition compartment.

5. In an internal combustion engine, a cylinder, a piston movable therein, a casing forming a chamber communicating with said cylinder for conducting a fuel mixture thereto, an intake valve mounted in said casing, and means including a plurality of deflectors commencing at said valve for keeping the fuel globules in contact with the wall of said chamber during the travel of said fuel along said chamber.

6. In an internal combustion engine, a cylinder, a piston movable therein, a cylinder head situated at the end of said cylinder providing a chamber having an ignition compartment therein and a vaporizing compartment communicating therewith, said ignition and vaporizing compartments having the walls thereof nearest said cylinder converging at substantially the same angularity throughout their extent, means for conducting a fuel mixture into said vaporizing compartment, and means for igniting the fuel mixture in said ignition compartment.

7. In an internal combustion engine, a cylinder, a piston movable therein, a cylinder head situated at the end of said cylinder providing a vaporizing compartment and an ignition compartment communicating therewith, an intake valve positioned at the mouth of said vaporizing compartment and adapted to cause the fuel mixture passing therethrough to impinge upon the wall of said vaporizing compartment, said vaporizing compartment having spiral ridges commencing at said valve and extending up to the outlet thereof for imparting a whirling motion to the fuel mixture upon entering said ignition compartment, and means for igniting the fuel mixture within said ignition compartment.

8. In an internal combustion engine, a cylinder, a piston movable therein, a cylinder head situated at the end of said cylinder providing two intercommunicating chambers, means for directing gas mixture into one chamber, said chamber having an opening leading into said other chamber and being formed with a wall converging toward said opening, said second chamber having an opening leading into the cylinder, a wall diverging from the opening from said first named chamber and a converging wall leading up to the opening to the cylinder, and means for igniting the fuel mixture.

9. In an internal combustion engine, a cylinder, a piston movable therein, a cylinder head situated at the end of said cylinder providing two intercommunicating chambers, means for directing gas mixture into one chamber, said chamber having an opening leading into said other chamber, said second chamber having an opening leading into the cylinder, a wall diverging from the opening from said first named chamber and a converging wall leading up to the opening to the cylinder, and means for igniting the fuel mixture.

10. In an internal combustion engine, a cylinder, a piston movable therein, a cylinder head situated at the end of said cylinder providing an elongated chamber, said chamber having annular constrictions within the same forming a plurality of intercommunicating symmetrical compartments, means for conducting a fuel mixture into one of said compartments, and means for igniting the fuel mixture in one of said compartments.

11. In an internal combustion engine, a cylinder, a piston movable therein, a cylinder head situated at the end of said cylinder providing an elongated chamber having two constrictions therein, a valve and seat at the end of said chamber for conducting fuel mixture into said chamber, the distance between the valve seat and the first constriction being substantially equal to the distance between restrictions, and means for igniting the fuel mixture.

In testimony whereof, I have signed my name to this specification.

WILLIAM A. SORG.